Patented Apr. 11, 1939

2,153,745

UNITED STATES PATENT OFFICE 2,153,745

PROCESS FOR RESOLVING PETROLEUM EMULSIONS

Melvin De Groote, University City, Mo., assignor to The Tret-O-Lite Company, Webster Groves, Mo., a corporation of Missouri No Drawing. Application February 28, 1938, Serial No. 193,063

4 Claims. (Cl. 196—4)

This invention relates to the treatment of emulsions of mineral oil and water, such as petroleum emulsions, and has for its object to provide a novel process for resolving or breaking petroleum emulsions of the water-in-oil type into their component parts of oil and water or brine.

The treating agent or demulsifying agent employed in the present process is a new composition of matter consisting of a certain kind of amine salt derived from water-soluble petroleum sulfonic acid, or acids of the kind hereinafter described. Said new material or composition of matter may be used either alone, or in admixture with conventional demulsifying agents, such, for example, as demulsifying agents of the modified fatty acid type, or of the alkylated aromatic sulfonic acid type.

Petroleum sulfonic acids are produced from a wide variety of petroleum distillates or petroleum fractions and in some instances they are produced from the crude petroleum itself. When produced from crude petroleum itself it is customary to use crude oil of the naphthene type, crude oil of the paraffin type, crude oil of the asphaltic type and mixtures of said three different types of crude oil.

The art of refining crude petroleum or various fractions, using sulfuric acid of various strengths as well as monohydrate and fuming acid, is a well known procedure. In such conventional refining procedure, petroleum sulfonic acids have been produced as by-products. For instance, in removing the olefinic components, it has been common practice to use sulfuric acid so as to polymerize the olefines or convert them into sulfonic acids which are subsequently removed. Likewise, in the production of white oil or highly refined lubricating oils, it has been customary to treat with fuming sulfuric acid so as to eliminate certain undesirable components.

In recent years, certain mineral oil fractions have been treated with sulfuric acid with the primary object of producing petroleum sulfonic acids, and in such procedure the petroleum sulfonic acids represented the primary objects of reaction rather than concomitant by-products.

Petroleum sulfonic acid, regardless of whether derived as the principal product of reaction or as a by-product, can be divided into two general products, to-wit, green acid or acids and mahogany acid or acids. The green acids are characterized by being water-soluble or dispersible. In other words, they form either true solutions or sols. For purpose of convenience, they will be herein referred to as water-soluble without any effort to indicate whether the solution is molecular or colloidal in nature. The green acids as indicated by their name frequently give an aqueous solution having a dark green or grey-green appearance. They generally appear as a component of the acid draw-off and do not remain behind dissolved in the oil fraction which has been subjected to sulfuric acid treatment. The green acids are not soluble in oil even when substantially anhydrous, and certainly are not soluble in oil when the contain as much as 15% of water. Similarly, their salts obtained by neutralizing the green acids with a strong solution of caustic soda, caustic potash, or ammonia, are not oil soluble. For convenience of classification the ammonium salt will be considered as an alkali salt.

In contradistinction to the hydrophile green acids, there occurs as in the manufacture of medicinal white oil, the oil soluble type or the mahogany acids. These mahogany acids are characterized by being soluble in oil, especially when anhydrous, and being soluble in oil even if they contain some dissolved water. Some of the mahogany acids also show limited hydrophilic properties to the extent that either some water can be dissolved in the acids or they in turn may dissolve to some extent in water. In some instances their salts, such as the sodium, ammonium, or potassium salt, will dissolve in water to give a colloidal sol. However, regardless of the presence of any hydrophilic properties whatsoever, they always have a characteristic hydrophobe property, as indicated by the fact that the substantially anhydrous form, for instance, their alkali salts containing 5–12% water, will dissolve in oil. This clearly distinguishes them from the green acids previously referred to, because the green acids in similar form containing the same amount of water, for example, will not dissolve in oil. The green acids as such are essentially hydrophilic and non-hydrophobic in character.

The utility of the mahogany acids in various arts has been enhanced by increasing their water solubility; for instance, converting the mahogany acids into hydroxy alkylamine salts. On the other hand, as far as I am aware, no valuable product of commerce has resulted from decreasing the water solubility of the mahogany acids by the addition of some oil soluble basic amine, such as, for example, triamylamine. The triamylamine salts of mahogany acids, for example, are completely devoid of any solubility in water which the alkali salts may have exhibited and show, as would be expected, an increased solubility in hydrophobe solvents.

Green acids are hydrophile in character as previously stated. Their hydrophile character has been increased by neutralization with materials such as triethanolamine and the like. Such green acid salts having enhanced water solubility as compared with the ordinary alkali salts, have found application in certain arts.

I have found that if green acids, that is, the oil-insoluble type, are neutralized with an alkylamine of the kind hereinafter described so as to produce a water-insoluble product, the resulting material, even though it does not exhibit any marked oil solubility, especially when it contains 5-10% of water, still has pronounced value as a demulsifier for oil field emulsions, either when used alone or when used in conjunction with other known demulsifying agents. I employ alkylamines of the kind which contain at least one alkyl radical having not less than five carbon atoms. I have also found that sometimes such an amine salt of green acids will mix in with a hydrophobe material and a hydrophile material so as to produce a homogeneous mixture. The effectiveness of the above described material or composition of matter as a demulsifying agent for oil field emulsions appears to be related to some factor other than its solubility characteristics.

The new composition of matter above described, which is employed as the demulsifying agent in my process is represented by the described alkylamine salts of hydrophilic non-hydrophobic green petroleum acids as exemplified by the diamylamine salt. The manufacture of said new composition of matter involves nothing more or less than neutralizing the selected petroleum sulfonic acid with a suitable amine until neutral to methyl orange indicator, or other suitable indicator. For purpose of convenience, I prefer that the selected petroleum sulfonic acid contains not over 15% of water. It is understood, of course, that the conventional procedure employing double decomposition instead of direct neutralization, can be employed in the manufacture of my new material or composition of matter. For instance, the sodium salt of the selected petroleum sulfonic acid can be dissolved in alcohol and the amine hydrochloride added so that sodium chloride will precipitate. After filtering off the precipitated sodium chloride, the alcohol can be evaporated and the amine salt recovered. If desired a mixture of amines instead of a single amine, may be employed.

There are a large number of alkylamines available which are characterized by having present at least one alkyl radical containing not less than five carbon atoms. Suitable examples include monoamylamine, diamylamine, triamylamine, hexylamine, dihexylamine, trihexylamine, octylamine, dioctylamine, decylamine, dodecylamine, octadecylamine, etc.

The amine may contain alkyl radicals having less than five carbon atoms present provided that there is at least one radical present that does have five carbon atoms. For instance, one might employ diamyl methyl amine, dihexyl ethyl amine, octyl propyl amine, decyl butyl amine, etc.

There is no objection to using an alkylamine of the kind described even though a hydroxy alkyl radical is present provided that neutralization of the green acids yields a water-insoluble salt. For instance, one might employ dioctyl ethanolamine or diamyl ethanolamine, etc. Similarly, one might employ an amine containing a glyceryl radical provided, however, there were present one or two alkyl radicals containing not less than five carbon atoms and provided that the salt derived from the green acids was water-insoluble.

It may be well to point out that hydrophile non-hydrophobe petroleum sulfonic acid or acids of the green acid type vary somewhat; for instance, the molecular weight may vary within the range of 350–500 or thereabouts. Naturally these petroleum sulfonic acids may carry some polymerized olefines, free hydrocarbons, or the like, or may even carry a bit of naphthenic acids which represent carboxylated non-sulfonated petroleum acids. As previously stated, these materials are well-known commercial products and are available in the open market either in the form of the acid itself or in the form of a salt.

The amine above described may properly be referred to as basic, inasmuch as its basicity is in the neighborhood of that of ammonia or triethanolamine. In some instances, the basicity may be somewhat greater or perhaps slightly less. In order to insure such basicity, it is necessary that there be no aryl or aromatic radical attached to the amino nitrogen atom. In other words, such materials as phenyl diamyl amine, diphenyl hexyl amine and phenyl octyl amine are not satisfactory because, due to the presence of the aromatic phenyl radical or any aryl radical, such as the naphthyl radical attached directly to the amino nitrogen atom, the basicity of the amine is reduced to that of aniline or the like. Such amines of low basicity do not form stable salts with the petroleum acids of the kind described. The term "sulfonic acid" used in the claims, is intended to mean and refer to a substance that consists either of a single acid or a mixture of acids.

Briefly described, my process consists simply in subjecting the emulsion to the action of a demulsifier consisting of the above described new material or composition of matter. Said material is used either alone or in admixture with another or with other conventional demulsifying agents and its method of use is the same as that generally employed in resolving or breaking petroleum emulsions of the water-in-oil type with a chemical demulsifier. In conformity with conventional practice, the demulsifier may be introduced into the well in which the emulsion is produced; introduced into a conduit through which the emulsion is flowing; or introduced into a tank in which the emulsion is stored. After treatment the emulsion is allowed to stand in a quiescent state, usualy in a settling tank and usually at a temperature varying from atmospheric temperature to about 200° F., so as to permit the water or brine to separate from the oil, it being preferable to keep the temperature low enough to prevent the volatilization of valuable constituents of the oil. The amount of demulsifier that may be required to break the emulsion may vary from 1 part of demulsifier to 500 parts of emulsion up to 1 part of demulsifier to 20,000 or even 30,000 parts of emulsion. The new composition of matter that is employed as the demulsifier in my process, constitutes the subject-matter of my divisional application Serial No. 256,729, filed February 16, 1939.

Having thus described my invention, what I claim as new and desire to secure by Letters Patent is:

1. A process for resolving petroleum emulsions of the water-in-oil type, characterized by subjecting the emulsion to the action of a demulsifier comprising a water-insoluble salt of an alkyl amine of the kind characterized by the absence of an aryl radical as a substituent for an amino hydrogen atom; said amine being characterized by the fact that at least one amino hydrogen atom has been replaced by an alkyl radical containing at least five carbon atoms; said amine salt being obtained from water-soluble nonhydrophobe petroleum sulfonic acid of the green acid type.

2. A process for resolving petroleum emulsions of the water-in-oil type, characterized by subjecting the emulsion to the action of a demulsifier comprising a water-insoluble salt of an alkyl amine; said amine being characterized by the fact that no amino hydrogen atom has been substituted by any radical other than an alkyl radical containing at least five carbon atoms; and said amine salt being obtained from water-soluble non-hydrophobe petroleum sulfonic acid of the green acid type.

3. A process for resolving petroleum emulsions of the water-in-oil type, characterized by subjecting the emulsion to the action of a demulsifier comprising a water-insoluble salt of an alkyl amine; said amine being characterized by the fact that no amino hydrogen atom has been substituted by any radical other than an alkyl radical containing at least five carbon atoms and not more than ten carbon atoms; and said amine salt being obtained from water-soluble non-hydrophobe petroleum sulfonic acid of the green acid type.

4. A process for resolving petroleum emulsions of the water-in-oil type, characterized by subjecting the emulsion to the action of a demulsifier comprising a water-insoluble salt derived from diamyl amine and water-soluble nonhydrophobe petroleum sulfonic acid of the green acid type.

MELVIN DE GROOTE.